(12) United States Patent
Matsunaga et al.

(10) Patent No.: US 10,495,435 B2
(45) Date of Patent: Dec. 3, 2019

(54) PITCH CONE ANGLE MEASUREMENT METHOD AND PITCH CONE ANGLE MEASUREMENT DEVICE

(71) Applicant: NTN CORPORATION, Osaka (JP)

(72) Inventors: Hiroshi Matsunaga, Shizuoka (JP);
Kazuhiro Kimpara, Shizuoka (JP)

(73) Assignee: NTN CORPORATION, Osaka (JP)

( * ) Notice: Subject to any disclaimer, the term of this patent is extended or adjusted under 35 U.S.C. 154(b) by 208 days.

(21) Appl. No.: 15/735,996

(22) PCT Filed: Jul. 8, 2016

(86) PCT No.: PCT/JP2016/070339
§ 371 (c)(1),
(2) Date: Dec. 13, 2017

(87) PCT Pub. No.: WO2017/018177
PCT Pub. Date: Feb. 2, 2017

(65) Prior Publication Data
US 2018/0180397 A1 Jun. 28, 2018

(30) Foreign Application Priority Data
Jul. 27, 2015 (JP) ................................. 2015-147714

(51) Int. Cl.
*G01B 5/24* (2006.01)
(52) U.S. Cl.
CPC ...................... *G01B 5/24* (2013.01)
(58) Field of Classification Search
CPC ....................................................... G01B 5/24
(Continued)

(56) References Cited

U.S. PATENT DOCUMENTS 3,397,459 A * 8/1968 Soldner ................. G01M 13/02
33/501.9
4,519,241 A * 5/1985 Hofler .................... G01B 7/283
33/501.9
(Continued)

FOREIGN PATENT DOCUMENTS

DE       32 12 082      10/1983
EP       0 264 717      4/1988
JP       2011-133237      7/2011

OTHER PUBLICATIONS

Extended European Search Report dated Feb. 21, 2019 in corresponding European Patent Application No. 16830282.6.
(Continued)

*Primary Examiner* — George B Bennett
(74) *Attorney, Agent, or Firm* — Wenderoth, Lind & Ponack, L.L.P.

(57) ABSTRACT

A pitch cone angle measurement method includes bringing an abutment portion into abutment against ridges, and bringing another abutment portion into abutment against the ridges at a position separated in a direction orthogonal to a rotation axis direction of the rotation power transmitting element by a radial distance from a position at which the ridges and the abutment portion are brought into abutment against each other. The method also includes measuring a distance in the rotation axis direction between the position at which the abutment portion is brought into abutment against the ridges and a position at which the other abutment portion is brought into abutment against the ridges, and calculating a pitch cone angle of the rotation power transmitting element based on the distance in the rotation axis direction and the predetermined radial distance.

20 Claims, 9 Drawing Sheets

(58) Field of Classification Search
USPC .................................. 33/534, 501.7–501.19
See application file for complete search history.

(56) References Cited

U.S. PATENT DOCUMENTS

| | | | | |
|---|---|---|---|---|
| 4,769,917 | A * | 9/1988 | Bertz | G01B 5/202 |
| | | | | 33/501.18 |
| 4,962,590 | A * | 10/1990 | Ambrose | G01B 5/202 |
| | | | | 33/501.14 |
| 5,152,071 | A * | 10/1992 | Bergeron | G01B 5/205 |
| | | | | 33/530 |
| 2006/0185184 | A1* | 8/2006 | McGlasson | B23F 23/12 |
| | | | | 33/645 |
| 2010/0083516 | A1* | 4/2010 | Mashue | G01M 13/021 |
| | | | | 33/501.7 |
| 2012/0247199 | A1 | 10/2012 | Hirono et al. | |
| 2013/0283627 | A1 | 10/2013 | Noda et al. | |
| 2014/0100044 | A1* | 4/2014 | Kimura | B21J 9/025 |
| | | | | 464/109 |
| 2015/0231920 | A1* | 8/2015 | Matsunaga | F16C 43/04 |
| | | | | 384/512 |
| 2018/0347683 | A1* | 12/2018 | Matsunaga | F16H 57/025 |
| 2019/0264745 | A1* | 8/2019 | Hiramatsu | F16C 33/64 |

OTHER PUBLICATIONS

International Preliminary Report on Patentability and Written Opinion of the International Searching Authority dated Jan. 30, 2018 in International (PCT) Application No. PCT/JP2016/070339.
International Search Report dated Sep. 13, 2016 in International (PCT) Application No. PCT/JP2016/070339.

* cited by examiner

A-A CROSS SECTION

B-B CROSS SECTION

C-C CROSS SECTION

D-D CROSS SECTION

E-E CROSS SECTION

F-F CROSS SECTION

PITCH CONE ANGLE MEASUREMENT METHOD AND PITCH CONE ANGLE MEASUREMENT DEVICE

TECHNICAL FIELD

The present invention relates to a pitch cone angle measurement method and a pitch cone angle measurement device for a rotation power transmitting element such as a face spline.

BACKGROUND ART

For example, a power transmission device configured to transmit engine power of an automobile and the like to a wheel needs to transmit the power from an engine to the wheel, and simultaneously allow an angular displacement and an axial displacement due to bouncing of the vehicle during travel as well as an angular displacement for a turn of the vehicle. Therefore, in general, a driveshaft of an automobile and the like has the following structure. A plunging type constant velocity universal joint that can adapt to the angular displacement and the axial displacement is arranged on a differential gear side (inboard side), and a fixed type constant velocity universal joint that can form a large operating angle is arranged on a drive wheel side (outboard side). Both of the constant velocity universal joints are coupled to each other through intermediation of the shaft. Moreover, the constant velocity universal joint on the drive wheel side (fixed type constant velocity universal joint) is coupled to a wheel bearing device configured to rotationally support the drive wheel.

Incidentally, a need for improvement in fuel economy of the automobile has been increasing in recent years, and a decrease in weight of the wheel bearing device, which is one of automobile components, is highly demanded. Hitherto, various proposals have been made to decrease the weight of the wheel bearing device, and, simultaneously, simplification in assembly and disassembly to decrease a work cost is also strongly needed in an assembly site and a repair market of the automobile.

A wheel bearing device 1 illustrated in FIG. 1 is a typical example of a structure capable of satisfying such needs. This wheel bearing device 1 is formed into a unit, and is constructed so as to be removably mounted to a constant velocity universal joint 31. In this case, the wheel bearing device 1 mainly includes an outer member 2, a hub wheel 3, an inner ring 4, balls 5 as rolling elements, and a retainer 6. Double-row outer raceway surfaces 7, 7 are formed on an inner periphery of the outer member 2, and a vehicle body mounting flange 2a configured to be mounted to a knuckle (not shown) of a vehicle body is integrally formed on an outer periphery of the outer member 2. A wheel mounting flange 8 configured to mount a wheel (not shown) is integrally formed at one end of the hub wheel 3. An inner raceway surface 9 opposing to one of the double-row outer raceway surfaces 7, 7 of the outer member 2 and a small-diameter step portion 10 having a cylindrical shape extending in the axial direction from the inner raceway surface 9 are formed on an outer periphery of the hub wheel 3. The inner ring 4 is press-fitted to the small-diameter step portion 10, and an inner raceway surface 9 opposing to another one of the double-row outer raceway surfaces 7, 7 of the outer member 2 is formed on an outer periphery of the inner ring 4. Moreover, the hub wheel 3 and the inner ring 4 construct an inner member 11. The plurality of balls 5, 5 are built so as to be rollable between the double-row outer raceway surfaces 7, 7 of the outer member 2 and the double-row inner raceway surfaces 9, 9 of the inner member 11, and the balls 5 are received in the retainer 6. The inner ring 4 is fixed in the axial direction by a staked portion 17 formed by plastically deforming an end portion of the small-diameter step portion 10 of the hub wheel 3 radially outward. In this case, a face spline 18 is formed on an end surface of the staked portion 17.

The constant velocity universal joint 31 mainly includes an outer joint member 32, an inner joint member 33, a cage 34, and torque transmitting balls 35. The outer joint member 32 includes a cup portion 36 and a bottom portion 37 integrally formed with the cup portion 36, and a female thread portion 38 is formed on an inner periphery of the bottom portion 37. In this case, a face spline 40 is formed on a shoulder portion 39 of the bottom portion 37. The face spline 40 is brought into abutment in the axial direction against the face spline 18 formed on an end surface of the staked portion 17 of the hub wheel 3, resulting in a mutually meshed state. With this configuration, a rotation torque from the shaft (not shown) can be transmitted to the wheel mounting flange 8 through the constant velocity universal joint 31 and the hub wheel 3.

The constant velocity universal joint 31 and the wheel bearing device 1 having the configurations described above are fastened and fixed to each other in the axial direction by, for example, treadedly engaging a fastening bolt 20 with the female thread 38 on the bottom portion 37 of the outer joint member 32. With such a configuration of the unit which is removably mounted, the weight and size can be reduced, and the disassembly and assembly work can be simplified.

Incidentally, a pitch cone angle is given as one of inspection items after the manufacturing of the rotation power transmitting element of this type. As illustrated in FIG. 2, FIG. 3A, and FIG. 3B, the pitch cone angle refers to an apex angle θ of a reference surface (pitch cone PC) having a conical shape acquired by overlapping pitch circles Pc1, Pc2, . . . respectively passing through meshing positions Pe1, P2, . . . between teeth 41 constructing the one face spline 40 and teeth 19 constructing the another mating face spline 18 (see FIG. 4 described later) in a rotation axis direction of the face splines 18 and 40. The pitch cone angle θ also affects strengths of the face splines 40 and 18, and it is important to evaluate the precisions thereof.

For example, in Patent Literature 1, a method of using a gauge head of a contact-type probe is proposed as a method of measuring a tooth shape of a gear.

CITATION LIST

Patent Literature 1: JP 2011-133237

SUMMARY OF INVENTION

Technical Problem

For example, the pitch cone angle of the face spline can be acquired with use of the measurement technology described in Patent Literature 1. However, in such a case, the contact-type probe needs to be used to scan a certain region on tooth surfaces, resulting in an increase in time required for the measurement work. Moreover, a tester (three-dimensional shape measurement device provided with the contact-type probe) according to the above-mentioned measurement technology is very expensive. For the above-mentioned reason, the existing measurement technology, for example, the technology described in Patent Literature 1 is not suitable for total inspection for mass-produced articles, for example, inline measurement work.

As a matter of course, the above-mentioned problem arises not only in the face spline, and is widely concerned in a general rotation power transmitting element that is formed by arranging a plurality of ridges in a circumferential direction, and is configured to enable transmission of rotation power through engagement with opposing ridges.

In view of the above-mentioned circumstances, a technical problem to be solved herein is to measure a pitch cone angle of a rotation power transmitting element such as a face spline in a simple manner and in a short period of time.

Solution to Problem

The above-mentioned problem is solved by a pitch cone angle measurement method according to the present invention. That is, according to a feature of the measurement method, there is provided a pitch cone angle measurement method of measuring a pitch cone angle of a rotation power transmitting element that is formed by arranging a plurality of ridges in a circumferential direction, and is configured to enable transmission of rotation power through engagement with opposing ridges, the pitch cone angle measurement method comprising: a first abutment step of bringing an abutment portion having predetermined shape and dimension into abutment against the plurality of ridges; a second abutment step of bringing the abutment portion into abutment against the plurality of ridges at a position separated from a position at which the plurality of ridges and the abutment portion are brought into abutment against each other in the first abutment step in a direction orthogonal to a rotation axis direction of the rotation power transmitting element by a predetermined radial distance; a distance measurement step of measuring a distance in the rotation axis direction between the position at which the plurality of ridges are brought into abutment against the abutment portion in the first abutment step and the position at which the plurality of ridges are brought into abutment against the abutment portion in the second abutment step; and a pitch cone angle calculation step of calculating a pitch cone angle of the rotation power transmitting element based on the measured distance in the rotation axis direction and the predetermined radial distance.

With the measurement method according to one embodiment of the present invention, the pitch cone angle of the rotation power transmitting element can be acquired based on a trigonometric function by simply bringing the abutment portion having the predetermined shape and dimension into abutment against the ridges at the two locations separated from each other by the predetermined distance in the direction orthogonal to the rotation axis direction of the rotation power transmitting element, namely the radial direction (radial distance), and acquiring the distance in the rotation axis direction between the abutment positions at the two locations, namely, a relative height between the abutment positions against the ridges. Thus, the pitch cone angle of the rotation power transmitting element can be acquired in a very simple and easy manner. Moreover, it is sufficient to perform the simple work of measuring the distance in the rotation axis direction between the abutment positions of the abutment portion and the ridges when the abutment portion having the predetermined shape and dimension is brought into abutment against the ridges at the two locations, and hence time required for work is shortened. Moreover, when only the above-mentioned operations and work are sufficient, a required facility is simplified, thereby being capable of reducing a work cost.

Further, in the pitch cone angle measurement method according to one embodiment of the present invention, the abutment portion may be moved in the rotation axis direction to bring the abutment portion into abutment against the plurality of ridges in each of the first abutment step and the second abutment step.

In one embodiment of the present invention, as described above, the ridges and the abutment portion are brought into abutment against each other at the two locations, and the distance in the rotation axis direction between the respective abutment positions is measured. Thus, when the abutment portion is moved in the rotation axis direction to bring the abutment portion into abutment against the ridges in each of the abutment steps, the distance in the rotation axis direction can be acquired based on stroke amounts (movement amounts in the rotation axis direction) of the abutment portion at this time. As a result, the distance in the rotation axis direction can be acquired more precisely, and a calculation precision of the pitch cone angle calculated based on the distance in the rotation axis direction can thus be increased.

Further, in the pitch cone angle measurement method according to one embodiment of the present invention, the shape and the dimension of the abutment portion may be set so that the abutment portion is brought into abutment against the plurality of ridges at meshing positions between the plurality of ridges and the opposing ridges.

The pitch cone angle of the rotation power transmitting element subject to the measurement of one embodiment of the present invention is the apex angle of the pitch cone acquired when the plurality of pitch circles of the rotation power transmitting element are overlapped in the rotation axis direction as described above, and the pitch circle is a virtual circle passing through the meshing positions between the ridges of the rotation power transmitting element with the opposing ridges (refer to FIG. 3A and FIG. 3B, and FIG. 4 described later). Thus, when the shape and the dimension of the abutment portion are set so that the abutment portion is brought into abutment against the ridges at the meshing positions between the ridges and the opposing ridges, the abutment points between the abutment portion and the ridges can be considered as being located at the meshing positions between the ridges and the opposing ridges. Thus, in this case, the distance in the rotation axis direction between the abutment positions of the abutment portion and the ridges acquired in the distance measurement step can directly be used for the calculation of the pitch cone angle. In other words, the pitch cone angle can directly be calculated as (distance in rotation axis direction)/(predetermined radial distance)=tan {90°−(half of pitch cone angle)} without correction of the measured value or the like (refer to FIG. 10 described later). Thus, this can also increase the calculation precision of the pitch cone angle.

Further, in the pitch cone angle measurement method according to one embodiment of the present invention, the abutment portion may have a spherical shape.

When the abutment portion is formed into the spherical shape as described above, the ridges and the abutment portion can be brought into abutment against each other in point contact accurately at intended positions regardless of shapes (particularly a shape of a side surface) of the ridges. Moreover, when the abutment portion is formed into a spherical shape, even when the abutment portion is brought into abutment against the ridges at a position displaced from the intended position, the abutment portion itself can be guided to the predetermined position between the side surfaces (for example, tooth surfaces) of the ridges. Therefore, very stable abutment work and the subsequent distance measurement work can be performed.

Further, in the pitch cone angle measurement method according to one embodiment of the present invention, two abutment portions is used so that one of the abutment portions is elastically supported by a relative displacement measurement portion, and another one of the abutment portions is configured to be movable integrally with the relative displacement measurement portion. A movement distance in the rotational axis direction of the another abutment portion from a state in which the one abutment portion is held in abutment against the plurality of ridges to a state in which the another abutment portion is moved in the rotation axis direction to bring the another abutment portion into abutment against the ridge is measured by the relative displacement measurement portion as a relative displacement of the one abutment portion in the rotation axis direction. The relative distance in the rotation axis direction may be calculated based on the measured movement distance.

As described above, when the two abutment portions and the relative displacement measurement portion are provided, and are integrally moved in the rotation axis direction, one of the abutment portions is first brought into abutment against the ridges, and then, the another one of the abutment portions is continuously moved in the rotation axis direction to be brought into abutment against the ridges. Consequently, the relative distance in the rotation axis direction can automatically be calculated. Thus, the relative distance in the rotation axis direction can automatically be calculated during the approach operation and the abutment operation of the abutment portion with respect to the ridges without individually detecting the abutment positions between the respective abutment portions and the ridges. Moreover, when a mechanism configured to integrally move the two abutment portions and the relative displacement measurement portion is provided, a stable measurement precision can be provided regardless of proficiency of a worker.

The above-mentioned pitch cone angle measurement method can suitably be applied to, for example, a case in which the rotation power transmitting element comprises a face spline.

Further, the above-mentioned pitch cone angle measurement method can suitably be applied to, for example, a case in which at least one of the rotation power transmitting element on which the plurality of ridges are formed and a mating rotation power transmitting element on which the opposing ridges are formed constructs a wheel bearing device.

Alternatively, the above-mentioned pitch cone angle measurement method can suitably be applied to, for example, a case in which at least one of the rotation power transmitting element on which the plurality of ridges are formed and a mating rotation power transmitting element on which the opposing ridge is formed constructs a constant velocity universal joint.

Alternatively, the above-mentioned pitch cone angle measurement method can suitably be applied to, for example, a case in which one of the rotation power transmitting element on which the plurality of ridges are formed and a mating rotation power transmitting element on which the opposing ridges are formed constructs a wheel bearing device, and another one of the rotation power transmitting element and the mating rotation power transmitting element constructs a constant velocity universal joint.

Further, the above-mentioned problem is solved also by a pitch cone angle measurement device according to the present invention. That is, according to a feature of the measurement device, there is provided a pitch cone angle measurement device which is configured to measure a pitch cone angle of a rotation power transmitting element that is formed by arranging a plurality of ridges in a circumferential direction, and is configured to engage with an opposing ridge, thereby enabling transmission of rotation power, the pitch cone angle measurement device comprising: a first abutment portion that has predetermined shape and dimension, and is capable of being brought into abutment against the plurality of ridges; a second abutment portion that has predetermined shape and dimension, and is capable of being brought into abutment against the plurality of ridges at a position separated from a position at which the plurality of ridges and the first abutment portion are brought into abutment against each other in a direction orthogonal to a rotation axis direction of the rotation power transmitting element by a predetermined radial distance; and a distance measurement portion that is configured to measure a distance in the rotation axis direction between the position at which the first abutment portion is brought into abutment against the plurality of ridges and the position at which the second abutment portion is brought into abutment against the plurality of ridges.

Similarly to the measurement method according to one embodiment of the present invention, with the measurement method according to one embodiment of the present invention, the pitch cone angle of the rotation power transmitting element can be acquired based on a trigonometric function simply by bringing the abutment portion having the predetermined shape and dimension into abutment against the ridges at the two locations separated from each other by the predetermined distance in the direction orthogonal to the rotation axis direction of the rotation power transmitting element, namely the radial direction (radial distance), and acquiring the distance in the rotation axis direction between the abutment positions at the two locations, namely, a relative height between the abutment positions against the ridges. Thus, the pitch cone angle of the rotation power transmitting element can be acquired in a very simple and easy manner. Moreover, it is sufficient to perform the simple work of measuring the distance in the rotation axis direction between the abutment positions between the abutment portion and the ridges when the abutment portion having the predetermined shapes and the dimensions is brought into abutment against the ridges at the two locations is sufficient, and hence time required for work is shortened. Moreover, when only the above-mentioned operations and work are sufficient, a required facility is simplified, thereby being capable of reducing a work cost.

Advantageous Effects of Invention

As described above, according to the present invention, it is possible to measure the pitch cone angle of the rotation power transmitting element such as the face spline in a simple manner and in a short period of time.

DESCRIPTION OF EMBODIMENTS

With reference to the drawings, description is made of an embodiment of the present invention.

Figure 1:
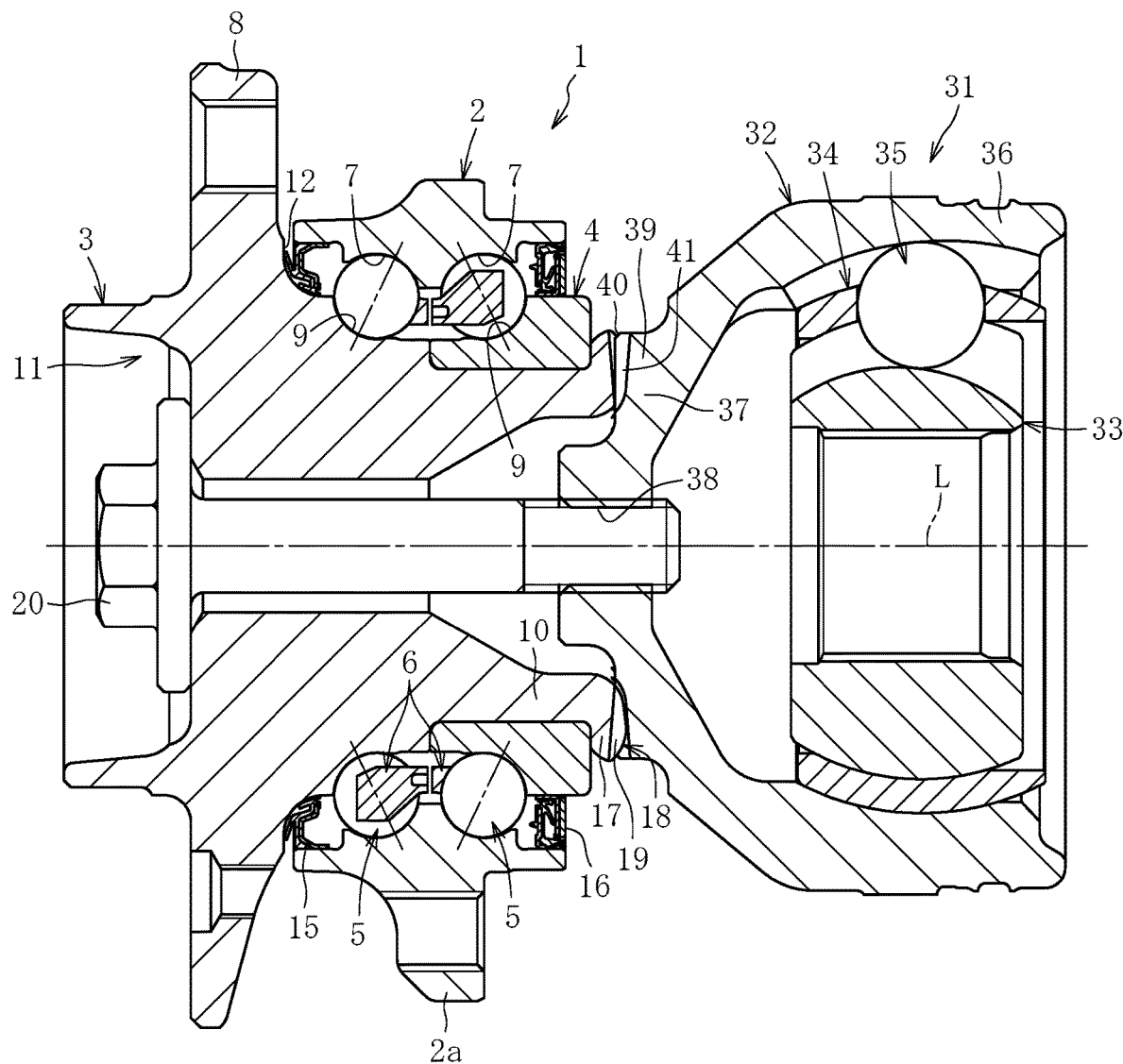
FIG. 1 is a cross-sectional view for illustrating a wheel bearing device and a constant velocity universal joint according to an embodiment of the present invention.
Figure 2:
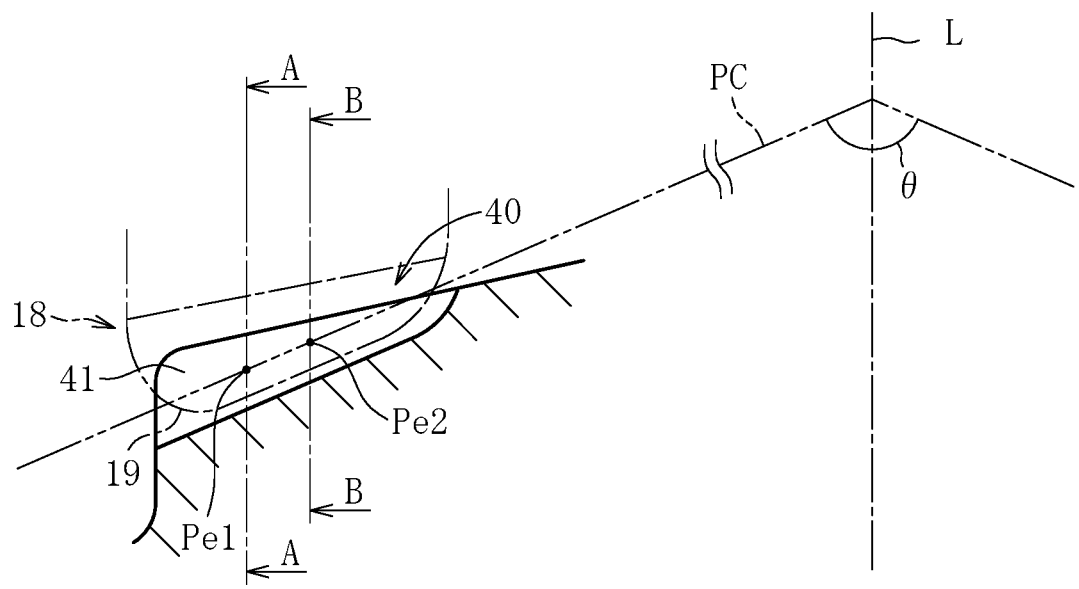
FIG. 2 is a cross-sectional view of a principal part for illustrating a pitch cone angle in the rotation power transmitting element.
Figure 3A:
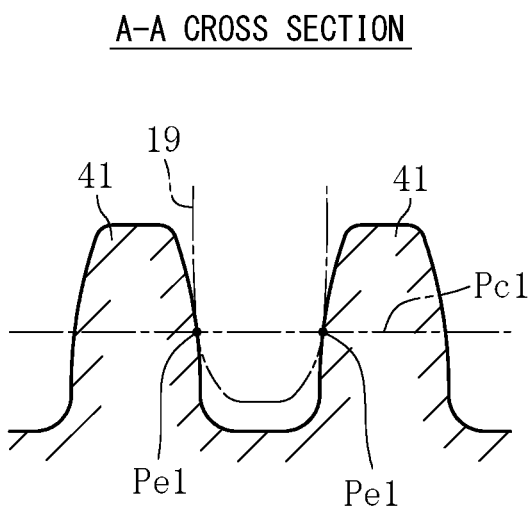
FIG. 3A is a cross-sectional view taken along the line A-A of FIG. 2, for illustrating the rotation power transmitting element illustrated in FIG. 2.
Figure 3B:
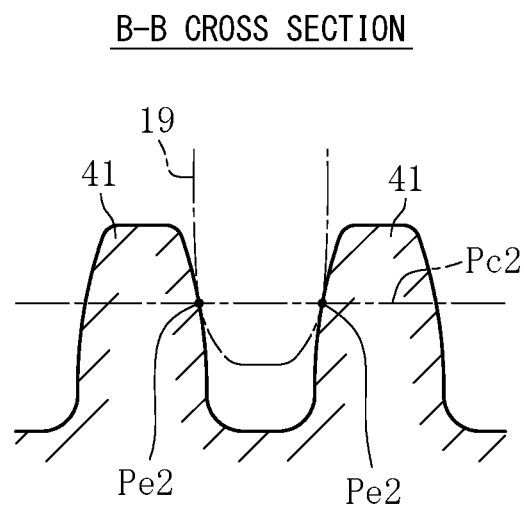
FIG. 3B is a cross-sectional view taken along the line B-B of FIG. 2, for illustrating the rotation power transmitting element illustrated in FIG. 2.
Figure 4:
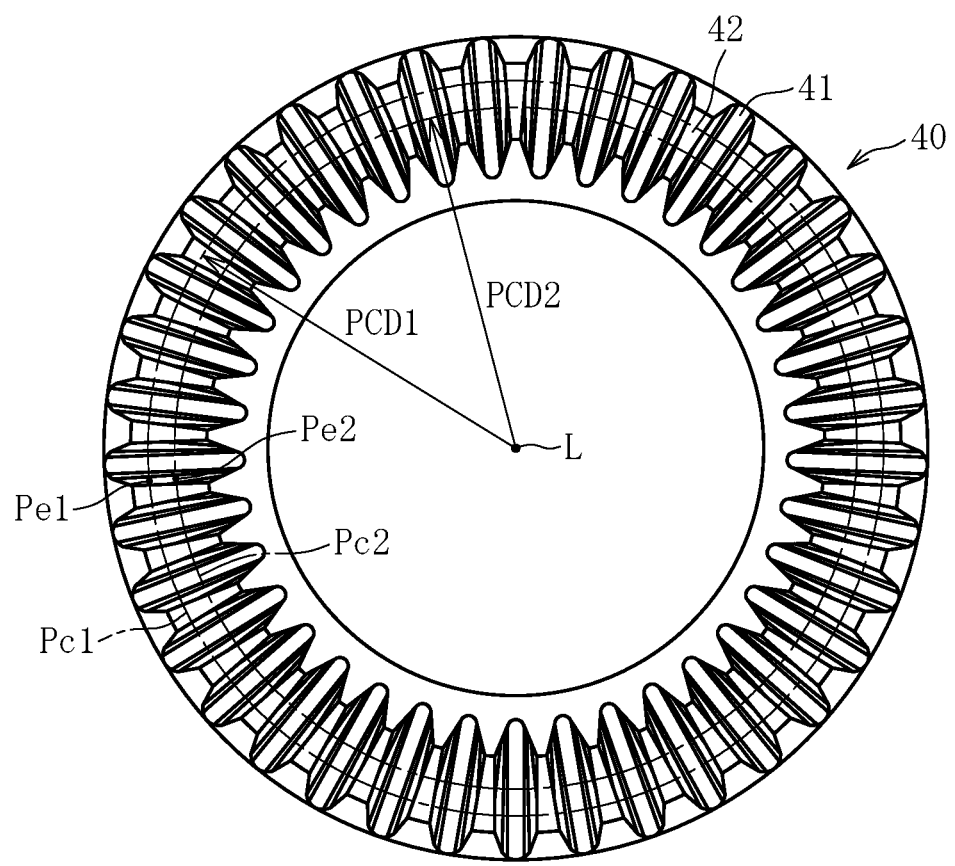
FIG. 4 is a plan view for illustrating a face spline provided on a side of the constant velocity universal joint illustrated in FIG. 1.

FIG. 4 is a view (plan view) for illustrating a face spline 40 formed on a bottom portion 37 of a constant velocity universal joint 31 illustrated in FIG. 1 as viewed in a direction along a rotation axis (in this case, a rotation axis L of an outer joint member 32). The face spline 40 is formed by arranging a plurality of teeth 41 being ridges in a circumferential direction. According to this embodiment, the face spline 40 has a shape symmetrical about its rotation axis L. Moreover, each of the teeth 41 extends in a radial direction of the face spline 40 (consequently the outer joint member 32), and a cross-sectional shape of each of the teeth 41 is the same on any cross section in the radial direction. A distance between the teeth 41 adjacent to each other in the circumferential direction (namely a dimension of a tooth bottom 42 in the circumferential direction) increases from the rotation axis L toward a radially outer side. As an example of specifications of the face spline 40, an outer diameter dimension of the face spline 40 in a case of being used for a passenger vehicle including a four-wheel drive vehicle is approximately from φ45 mm to φ70 mm. The module of the teeth 41 is approximately from 1 mm to 3 mm. The pressure angle is approximately in a range from 20° to 30°. A face spline 18 provided on a side of the wheel bearing device 1 also has the same shapes and specifications.

The face splines 18 and 40 can be formed by various methods. Although not illustrated, for example, the face spline 40 provided on the side of the constant velocity universal joint 31 can be formed on a shoulder portion 39 of the bottom portion 37 simultaneously when the outer joint member 32 is formed by plastic working. As a matter of course, after the outer joint member 32 is manufactured, the face spline 40 may be formed by plastic working on the shoulder portion 39 of the bottom portion 37. Alternatively, the face spline 40 may be formed by appropriate methods other than the plastic working (for example, cutting work through NC control).

Moreover, for example, the face spline 18 provided on the side of the wheel bearing device 1 may be formed simultaneously with a staked portion 17 with use of an orbital forming machine in a rotary mode (not shown). As a matter of course, the forming method for the face spline 18 is not limited to the swinging forming in the rotary mode, and the face spline 18 may be formed by other swinging forming, plastic working, or the like.

Next, with reference to FIG. 5 to FIG. 11B, description is made of an example of a pitch cone angle measurement method for the face splines 18 and 40. In this embodiment, description is made of a case in which the pitch cone angle of the face spline 40 provided on the side of the constant velocity universal joint 31 out of the face splines 18 and 40 is measured as an example.

Figure 5:
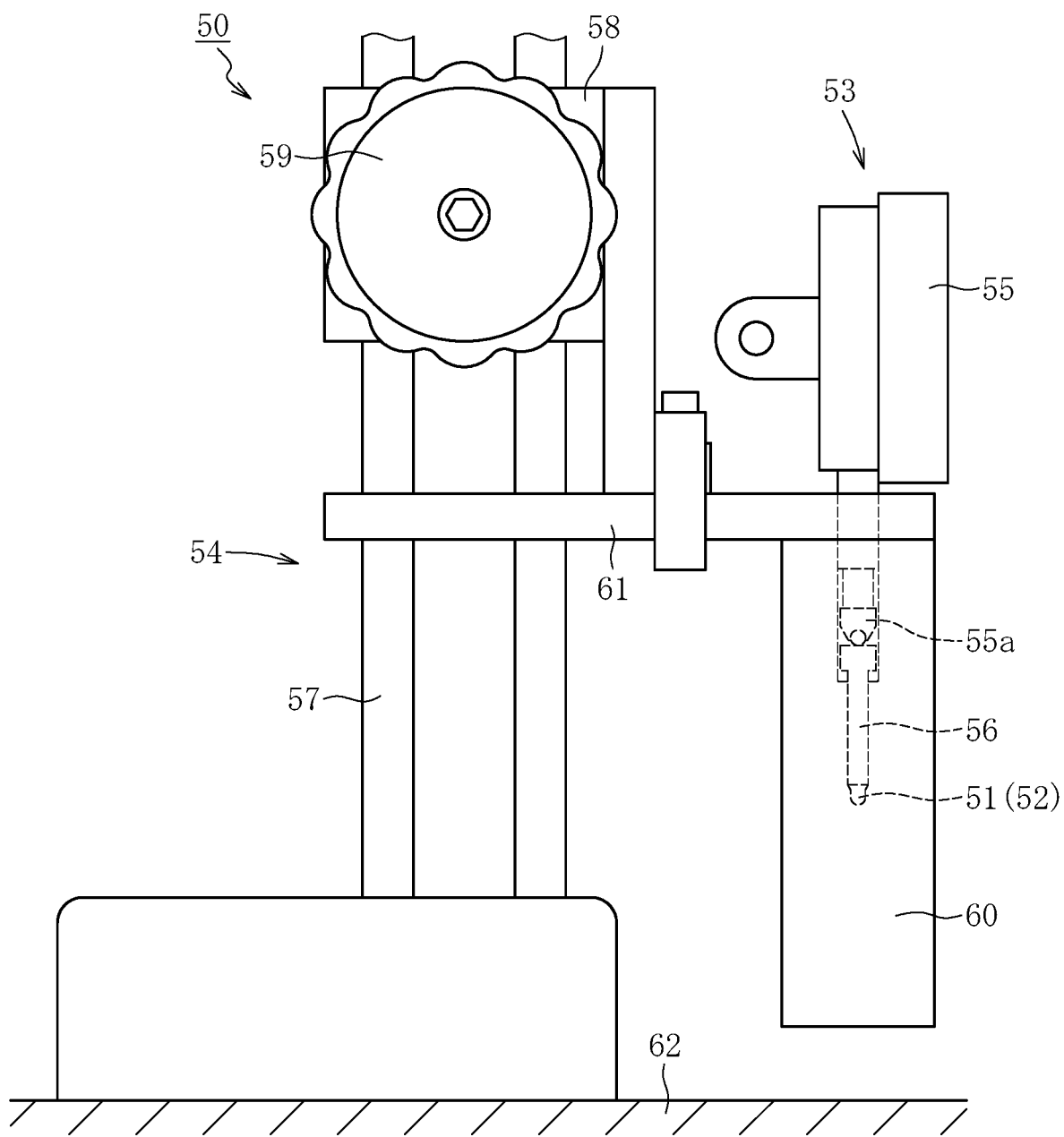
FIG. 5 is a side view for illustrating a pitch cone angle measurement device according to the one embodiment of the present invention.
Figure 6:
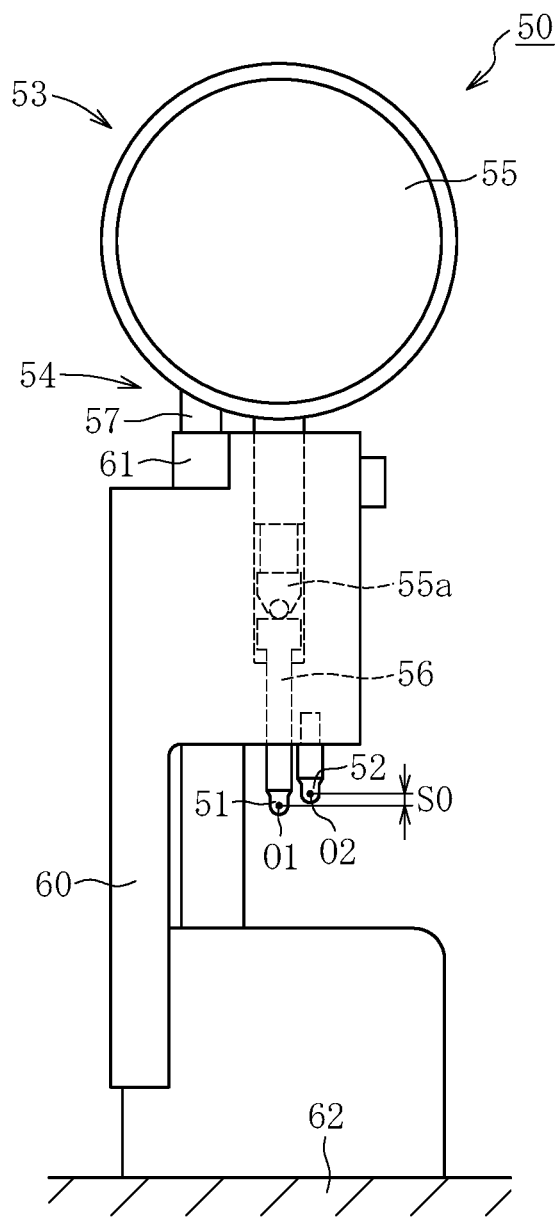
FIG. 6 is a front view for illustrating the pitch cone angle measurement device illustrated in FIG. 5.

FIG. 5 is a front view for illustrating an entire configuration of a pitch cone angle measurement device 50 according to the embodiment of the present invention, and FIG. 6 is a side view for illustrating the pitch cone angle measurement device 50. As illustrated in FIG. 5 and FIG. 6, the pitch cone angle measurement device 50 comprises a first abutment portion 51, a second abutment portion 52, a distance measurement portion 53, and a lift mechanism 54. The first abutment portion 51 is capable of being brought into abutment against the teeth 41 of the face spline 40 being ridges. The second abutment portion 52 is provided independently of the first abutment portion 51, and is capable of being brought into abutment against the teeth 41 of the face spline 40. The lift mechanism 54 is configured to integrally lift up and down the first and second abutment portions 51 and 52 and the distance measurement portion 53.

The first abutment portion 51 can have any suitable shape and dimension as long as the first abutment portion 51 can be brought into abutment against tooth surfaces 41a of the teeth 41 of the face spline 40 on the constant velocity universal joint 31 side. In this embodiment, the first abutment portion 51 has, for example, a spherical shape. Moreover, in this case, as illustrated in, for example, FIG. 9A described later and the like, an outer diameter dimension of the first abutment portion 51 is set so that the first abutment portion 51 is brought into abutment against the tooth surfaces 41a of the teeth 41 at meshing positions Pe1 between the teeth 41 of the face spline 40 subject to the measurement and the tooth 19 of the opposing face spline 18.

Figure 8:
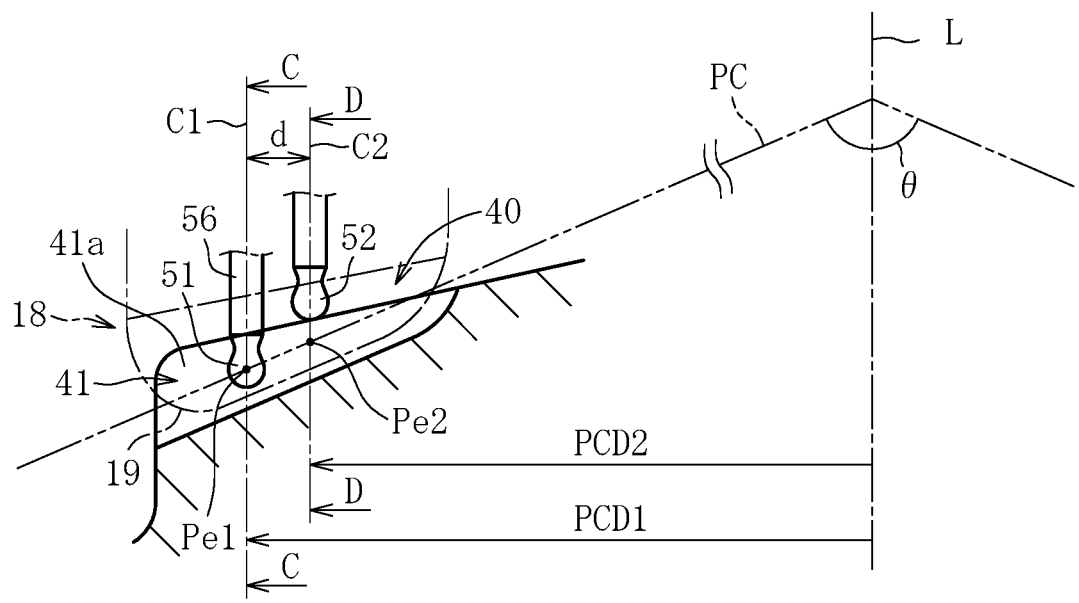
FIG. 8 is a view for illustrating the example of the pitch cone angle measurement method with use of the measurement device illustrated in FIG. 5, and is an enlarged cross-sectional view of a principal part for illustrating a state in which a first abutment portion is held in abutment against tooth surfaces of the face spline.

The second abutment portion 52 is arranged at a position separated from the first abutment portion 51 by a predetermined distance in a direction orthogonal to its movement direction. Specifically, as illustrated in FIG. 8, the second abutment portion 52 is arranged so that a center axis C2 is positioned at a position separated from a center axis C1 of the first abutment portion 51 in the direction orthogonal to the direction along the rotation axis L of the constant velocity universal joint 31 (right-and-left direction of FIG. 8) by a predetermined radial distance d.

In addition, similarly to the first abutment portion 51, the second abutment portion 52 can have any suitable shape and dimension as long as the second abutment portion 52 can be brought into abutment against the tooth surfaces 41a of the teeth 41 of the face spline 40 on the constant velocity universal joint 31 side. In this embodiment, the second abutment portion 52 has, for example, a spherical shape. Moreover, in this case, as illustrated in, for example, FIG. 11B described later and the like, an outer diameter dimension of the second abutment portion 52 is set so that the second abutment portion 52 is brought into abutment against the tooth surfaces 41a of the teeth 41 at meshing positions Pe2 between the teeth 41 of the face spline 40 subject to the measurement and the tooth 19 of the opposing face spline 18. When the tooth 41 of the face spline 40 has the same cross-sectional shape along its lengthwise direction as in this embodiment, an outer diameter dimension of the second abutment portion 52 is set so as to be the same size as the outer diameter dimension of the first abutment portion 51.

The distance measurement portion 53 is configured to enable measurement of a relative movement distance in the rotation axis L direction of the second abutment portion 52 from the state in which the first abutment portion 51 is held in abutment against the tooth surfaces 41a of the teeth 41. According to this embodiment, the distance measurement portion 53 is constructed by, for example, a dial gauge 55 being a relative displacement measurement portion, and is configured to bring a gauge head 55a into abutment against a movable pin 56 coupled to the first abutment portion 51, thereby being capable of elastically supporting the first abutment portion 51 coupled to the movable pin 56.

Figure 7:
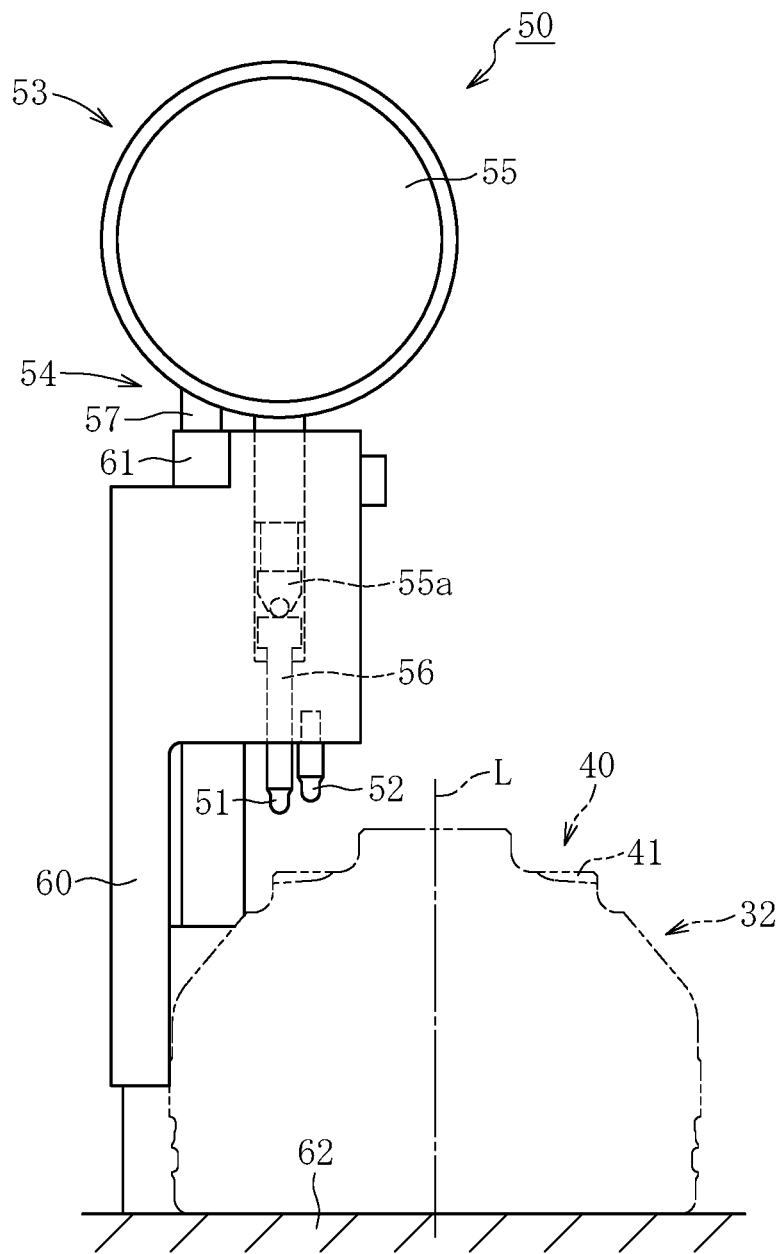
FIG. 7 is a view for illustrating an example of a pitch cone angle measurement method with use of the measurement device illustrated in FIG. 5, and is a front view for illustrating a state in which the face spline subject to the measurement is arranged at a predetermined position of the measurement device.

The lift mechanism 54 comprises support columns 57, a sliding portion 58 mounted to the support columns 57 so as to be slidable, and a lift feeder handle 59 configured to apply a driving force to the sliding portion 58, and, for example, a height gauge may be used as the lift mechanism 54. According to this embodiment, the support columns 57 of the lift mechanism 54 are provided in parallel with the rotation axis L of the face spline 40 subject to the measurement (FIG. 7), and the first abutment portion 51, the second abutment portion 52, and the distance measurement portion 53 are integrally provided on the sliding portion 58. As a result, when the lift feeder handle 59 is driven (a driving force is applied through a rotation operation by a worker in the illustrated example), the first and second abutment portions 51 and 52 integrally provided on the sliding portion 58 are configured to be lifted up and down along the rotation axis L of the constant velocity universal joint 31 (FIG. 7).

Moreover, according to this embodiment, a positioning portion 60 is provided in the vicinity of the first and second abutment portions 51 and 52. The positioning portion 60 is coupled and fixed to the sliding portion 58 through, for example, a coupling portion 61 extending in a horizontal direction, and, as illustrated in FIG. 7, is configured to enable positioning of the outer joint member 32 so that the first and second abutment portions 51 and 52 can respectively be brought into abutment against the tooth surfaces 41a at the radial predetermined positions of the common teeth 41 under a state in which the positioning portion 60 is held in abutment against an outer peripheral surface of the outer joint member 32 on which the face spline 40 subject to the measurement is formed. Reference numeral 62 denotes a surface plate (refer to FIG. 5 to FIG. 7).

Now, mainly with reference to FIG. 7 to FIG. 11B, description is made of an example of the measurement method for the pitch cone angle θ of the face spline 40 with use of the measurement device 50 constructed as described above.

(S1) Positioning Step

First, as illustrated in FIG. 7, the outer joint member 32 (or the constant velocity universal joint 31 including the outer joint member 32) on which the face spline 40 subject to the measurement is formed is brought into abutment against the positioning portion 60 of the pitch cone angle measurement device 50. In this case, the outer peripheral surface of the outer joint member 32 is brought into abutment against the positioning portion 61 so that the rotation axis L of the face spline 40 is parallel with the lift direction of the sliding portion 58, thereby bringing about a state in which the face spline 40 is positioned to have a predetermined posture at a predetermined position.

(S2) First Abutment Step

Figure 9A:
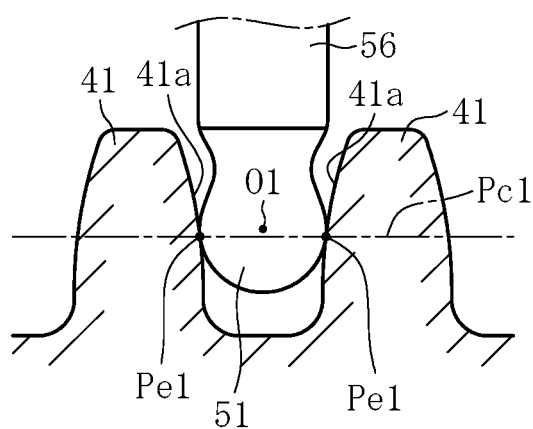
FIG. 9A is a cross-sectional view taken along the line C-C of FIG. 8, for illustrating a position relationship between the first abutment portion and the tooth surfaces in the state illustrated in FIG. 8.
Figure 9B:
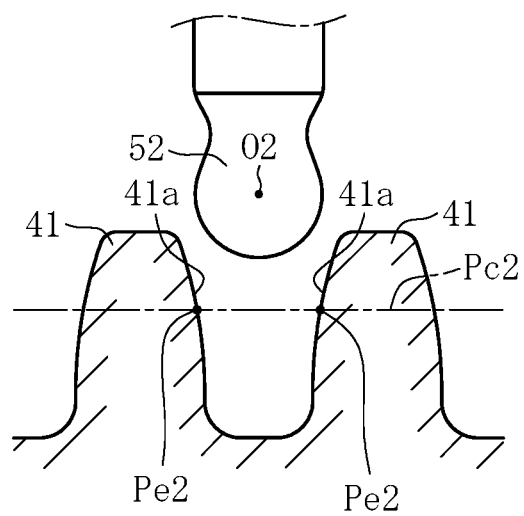
FIG. 9B is a cross-sectional view taken along the line D-D of FIG. 8, for illustrating a position relationship between a second abutment portion and the tooth surfaces in the state illustrated in FIG. 8.

Then, the lift feeder handle 59 of the lift mechanism 54 is driven to lift down the sliding portion 58, thereby bringing the first abutment portion 51 integrally provided on the sliding portion 58 into abutment against the tooth surfaces 41a of the face spline 40 (FIG. 8 and FIG. 9A). According to this embodiment, the first abutment portion 51 is brought into abutment against the tooth surfaces 41a, 41a adjacent to each other in the circumferential direction at the meshing positions Pe1 between the teeth 41 of the face spline 40 subject to the measurement and the opposing tooth 19. In this state, namely a state in which the first abutment portion 51 is held in abutment against the tooth surfaces 41a, a dial reading (relative position of the first abutment portion 51) of the dial gauge 55 constructing the distance measurement portion 53 is set to zero. In this case, the second abutment portion 52 is not brought into abutment against the tooth surfaces 41a yet (FIG. 8 and FIG. 9B).

(S3) Second Abutment Step

Figure 10:
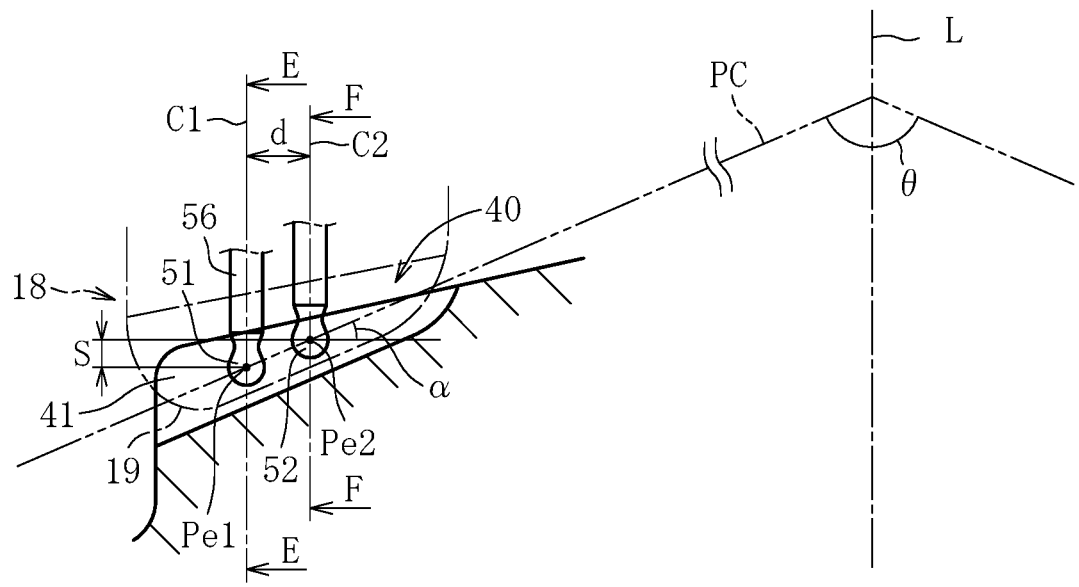
FIG. 10 is a view for illustrating the example of the pitch cone angle measurement method with use of the measurement device illustrated in FIG. 5, and is an enlarged cross-sectional view of a principal part for illustrating a state in which the second abutment portion is held in abutment against the tooth surfaces of the face spline.
Figure 11A:
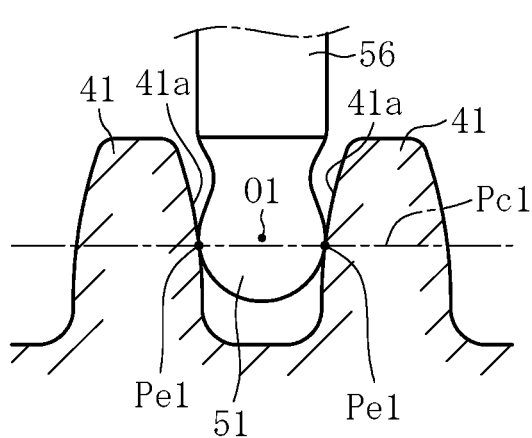
FIG. 11A is a cross-sectional view taken along the line E-E of FIG. 10, for illustrating a position relationship between the first abutment portion and the tooth surfaces in the state illustrated in FIG. 10.
Figure 11B:
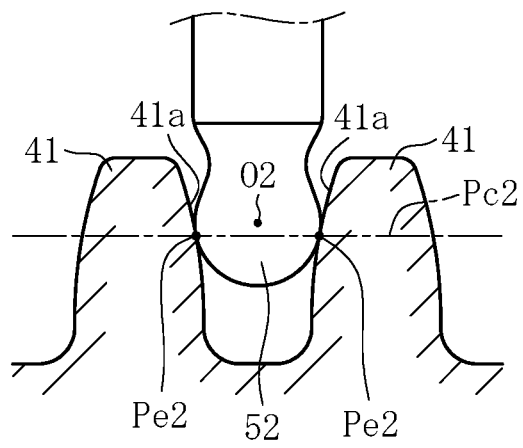
FIG. 11B is a cross-sectional view taken along the line E-E of FIG. 10, for illustrating a position relationship between the second abutment portion and the tooth surfaces in the state illustrated in FIG. 10.

The sliding portion 58 of the lift mechanism 54 is further lifted down from the state in which the first abutment portion 51 is held in abutment against the tooth surfaces 41a in such a manner, and the second abutment portion 52 integrally provided on the sliding portion 58 is brought into abutment against the tooth surfaces 41a of the face spline 40 (FIG. 10 and FIG. 11B). According to this embodiment, the second abutment portion 52 is brought into abut against the tooth surfaces 41a common to the tooth surfaces 41a against which the first abutment portion 51 held in abutment (FIG. 10), and is simultaneously brought into abutment against the tooth surfaces 41a, 41a adjacent to each other in the circumferential direction at the meshing positions Pe2 with the opposing tooth 19 (FIG. 11B).

(S4) Relative Distance Measurement Step

After the first and second abutment portions 51 and 52 are brought into abutment against the common tooth surfaces 41a in such a manner, a relative distance in the rotation axis L direction between the position at which the first abutment portion 51 and the tooth surfaces 41a are brought into abutment against each other and the position at which the second abutment portion 52 and the tooth surfaces 41a are brought into abutment against each other is measured. According to this embodiment, a separation distance S in the rotation axis L direction between a center position O1 of the first abutment portion 51 in the state in which the first abutment portion 51 is held in abutment against the tooth surfaces 41a at the meshing positions Pe1 and a center position O2 of the second abutment portion 52 in the state in which the second abutment portion 52 is held in abutment against the tooth surfaces 41a at the meshing positions Pe2 (FIG. 10) is measured. In this case, a lift down amount of the second abutment portion 52 from the state in which the first abutment portion 51 is held in abutment against the tooth surfaces 41a to the state in which the second abutment portion 52 is held in abutment against the tooth surfaces 41a corresponds to a relative displacement of the dial gauge 55 (FIG. 7). Moreover, when both the abutment positions between the first and second abutment portions 51 and 52 and the tooth surfaces 41a are the same as the meshing positions Pe1 and Pe2, and the shapes and the dimensions of both of the abutment portions 51 and 52 are the same, the above-mentioned relative displacement of the dial gauge 55 is equal to a value acquired by subtracting a separation distance S between the center positions O1 and O2 when the first and second abutment portions 51 and 52 are brought into abutment against the tooth surfaces 41a from an initial separation distance S0 between the center positions O1 and O2 of both of the abutment portions 51 and 52 (refer to FIG. 6). Moreover, this separation distance S may be considered to be equal to a difference PCD1-PCD2 between pitch circle radii PCD1 and PCD2 (refer to FIG. 8 and the like) at the respective meshing positions Pe1 and Pe2. Thus, a value acquired by subtracting (an absolute value of) a value, which is acquired by subtracting the dial reading of the dial gauge 55 in the state in which the first abutment portion 51 is held in abutment against the tooth surfaces 41a from the dial reading of the dial gauge 55 in the state in which the second abutment portion 52 is held in abutment against the tooth surfaces 41a, from the initial separation distance S0 is measured as the separation distance S. According to this embodiment, the dial reading of the dial gauge 55 is set to zero when the first abutment portion 51 is held in abutment against the tooth surfaces 41a, and a value acquired by subtracting (an absolute value of) the dial reading of the dial gauge 55 in the state in which the second abutment portion 52 is held in abutment against the tooth surfaces 41a from the initial separation distance S0 is thus the separation distance S.

(S5) Pitch Cone Angle Calculation Step

Finally, the pitch cone angle $\theta$ of the face spline 40 is calculated based on the separation distance S acquired in Step S4 and the radial distance d. As illustrated in FIG. 10, the following equation 1 holds true for a relationship between the separation distance S in a vertical direction between the center positions O1 and O2 of the first and second abutment portions 51 and 52 and the radial distance d. In this case, an angle $\alpha$ is an angle of an intersection between a line connecting between the center positions O1 and O2 of the first and second abutment portions 51 and 52 and a line orthogonal to the rotation axis L, and the following equation 2 holds true for a relationship between the angle $\alpha$ and the pitch cone angle $\theta$ subject to the calculation.

$$\frac{S}{d} = \tan\alpha \quad [\text{Math. 1}]$$

$$\alpha + \frac{\theta}{2} = \frac{\pi}{2} \quad [\text{Math. 2}]$$

Thus, the pitch cone angle $\theta$ can be acquired as the following equation 3, which is a function of the separation distance S in the vertical direction between the center positions O1 and O2 and the radial distance d, based on the equations 1 and 2.

$$\theta = \pi - \operatorname{Arctan}\frac{S}{d} \quad [\text{Math. 3}]$$

In such a manner, with the measurement device 50 according to the present invention, the pitch cone angle $\theta$ of the face spline 40 can be acquired based on the trigonometric function by simply bringing the abutment portions 51 and 52 having the predetermined shape and the dimension into abutment against the tooth surfaces 41a at the two locations separated by the predetermined distance (radial distance d) in the direction orthogonal to the rotation axis L direction of the face spline 40, in other words, in the radial direction of the face spline 40, and acquiring the separation distance S in the rotation axis L direction between the abutment positions Pe1 and Pe2 at the two locations in this case. Thus, the pitch cone angle $\theta$ of the face spline 40 can be acquired in a very simple and easy manner. Moreover, it is sufficient to perform the simple work of measuring the separation distance S in the rotation axis L direction between the abutment positions Pe1 and Pe2 of the abutment portions 51 and 52 and the tooth surfaces 41a when the abutment portions 51 and 52 having the predetermined shape and dimension are brought into abutment against the tooth surfaces 41a at the two locations, and hence time required for work can be shortened. Moreover, when only the above-mentioned operations and work are sufficient, a required facility is simplified, thereby being capable of reducing in a work cost.

Particularly, as in this embodiment, the first abutment portion 51 is elastically supported by the dial gauge 55 being the distance measurement portion 53, and the lift down amount of the second abutment portion 52 from the state in which the first abutment portion 51 is held in abutment against the tooth surfaces 41a to the state in which the second abutment portion 52 is held in abutment against the tooth surfaces 41a is acquired as the dial reading variation of the dial gauge 55 (relative displacement of the first abutment portion 51 with respect to the dial gauge 55). Therefore, the separation distance S and, consequently, the pitch cone angle $\theta$ can thus automatically be acquired by the simple work of lifting down the first and second abutment portions 51 and 52, and sequentially bringing the first and second abutment portions 51 and 52 into abutment against the common tooth surfaces 41a. Thus, the pitch cone angle $\theta$ can more simply be acquired. Moreover, a stable measurement precision can be acquired regardless of proficiency of a worker by providing the mechanism (lift mechanism 54) configured to integrally move the first and second abutment portions 51 and 52 and the distance measurement portion 53.

In the above, description is made of the embodiment of the present invention, but the pitch cone angle measurement method and the measurement device 50 may take other forms as long as the forms are within the scope of the present invention.

For example, in the embodiment, description is made of the case in which the outer diameter dimensions of the first and second abutment portions 51 and 52 are set so that the respective abutment portions 51 and 52 are brought into abutment against the tooth surfaces 41a of the teeth 41 at the meshing positions Pe1 between the teeth 41 of the face spline 40 subject to the measurement and the tooth 19 of the opposing face spline 18. However, as a matter of course, the first and second abutment portions 51 and 52 may be set to have shape and dimension other than such shape and dimension. Although not illustrated, for example, the abutment positions between the tooth surfaces 41a and the respective abutment portions 51 and 52 are acquired based on the preset shapes and dimensions of the respective abutment portions 51 and 52, separation distances in the rotation axis L direction between the respective abutment positions and the meshing positions Pe1 and Pe2 are respectively calculated, and those calculated separation distances are acquired as correction values. As a result, the pitch cone angle θ can precisely be calculated in consideration of actual displacements in a height direction respectively between the abutment positions against the tooth surfaces 41a and the meshing positions Pe1 and Pe2 with the tooth surfaces 41a.

Moreover, in the embodiment, the case in which the two abutment portions 51 and 52 are used to acquire the pitch cone angle θ is exemplified. However, as a matter of course, the present invention may take configurations and methods other than this case.

For example, in the embodiment, the case in which the relative movement distance of the first abutment portion 51 is measured by the distance measurement portion 53 (dial gauge 55), and the separation distance S is calculated based on the measured relative movement distance is exemplified. However, as a matter of course, the separation distance S may be calculated by a method other than this. Although not illustrated, for example, the separation distance S in the rotation axis L direction from the position at which the first abutment portion 51 is held in abutment against the tooth surfaces 41a to the position at which the second abutment portion 52 is held in abutment against the tooth surfaces 41a may be calculated by providing a position detector that is capable of detecting the positions in the slide direction of the respective abutment portions 51 and 52.

Alternatively, as in the above-mentioned embodiment, when a height gauge is used as the lift mechanism 54, an abutment detection portion configured to detect the abutment of the respective abutment portions 51 and 52 against the tooth surfaces 41a may be provided to acquire positions in the rotation axis L direction when the abutment is detected, thereby calculating the separation distance S in the rotation axis L direction.

Figure 12:
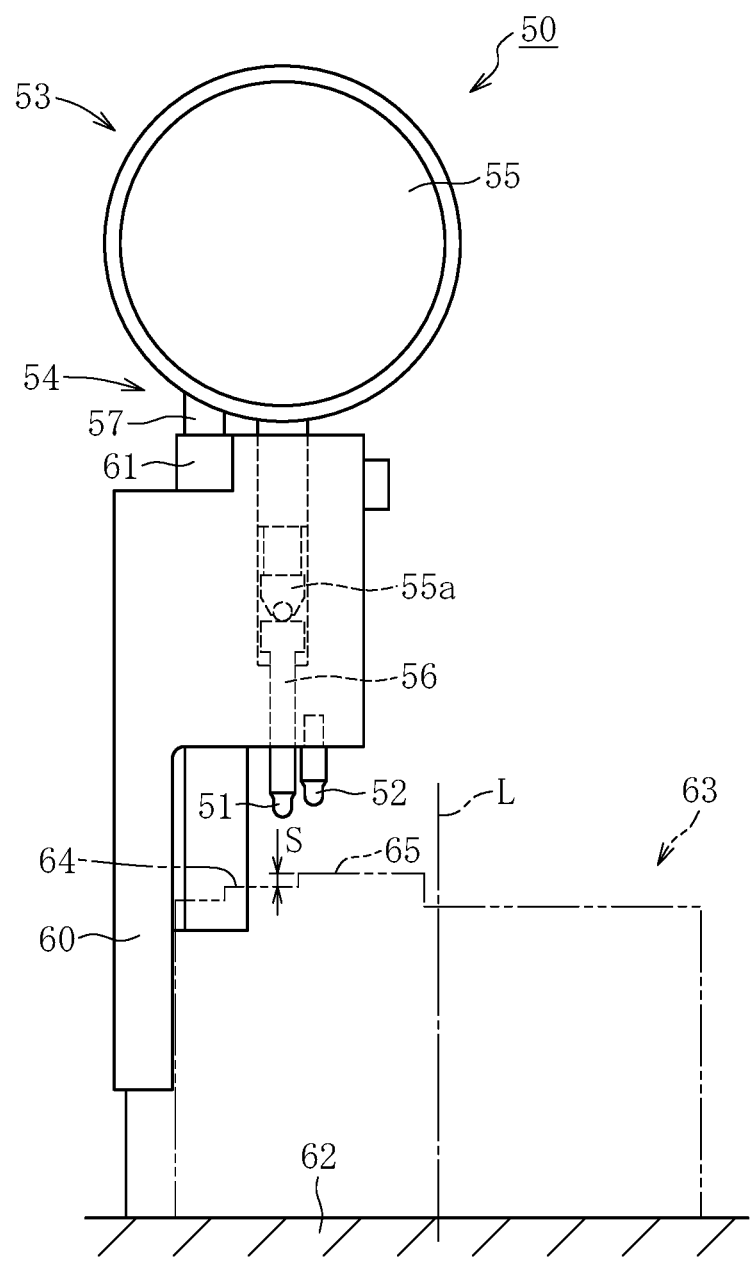
FIG. 12 is a view for illustrating an example of a calibration operation of a distance measurement portion with use of a model block, and is a front view for illustrating a state in which the model block is arranged at a predetermined position of the measurement device.

Moreover, as illustrated in FIG. 12, a model block 63 comprising a first flat surface 64 and a second flat surface 65 may be used in advance to calibrate the distance measurement portion 53 (dial gauge 55), thereby simplifying the relative distance measurement step S4 and the pitch cone angle calculation step S5. In otherwise, a step between the first flat surface 64 and the second flat surface 65 parallel with each other of the model block 63 is set to an intended dimension of the separation distance S between the center positions O1 and O2 of the first and second abutment portions 51 and 52. Then, the first abutment portion 51 is brought into abutment against the first flat surface 64, and, then, the second abutment portion 52 is brought into abutment against the second flat surface 65 under a state in which the model block 63 is held in abutment against the positioning portion 60 (FIG. 12). Then, the dial of the dial gauge 55 is set to zero in this state. When the dial of the dial gauge 55 is once set to zero in such a manner, it is then possible to instantaneously determine whether or not the pitch cone angle θ of the face spline 40 is within an allowable range by simply actually and sequentially bringing the first and second abutment portions 51 and 52 into abutment against the tooth surfaces 41a of the face spline 40 subject to the measurement, and reading the dial of the dial gauge 55 in this case (specifically a variation from zero toward a plus or minus direction) (a permissible variation from the intended dimension of the separation distance S is calculated in advance through inverse calculation from the separation distances S at an upper limit and a lower limit of the pitch cone angle θ).

Moreover, in the description made above, the case in which the pitch cone angle θ of the face spline 40 is the measurement subject is exemplified. However, as a matter of course, the measurement method and the measurement device 50 according to the present invention may also be applied to a rotation power transmitting element other than the face spline 40. In other words, the present invention may be applied to a rotation power transmitting element which is suitably constructed as long as the element has a pitch cone angle and is formed by arranging a plurality of ridges in the circumferential direction.

The invention claimed is:

1. A pitch cone angle measurement method of measuring a pitch cone angle of a rotation power transmitting element that is formed by arranging a plurality of ridges in a circumferential direction, and is configured to enable transmission of rotation power through engagement with opposing ridges, the pitch cone angle measurement method comprising:
   a first abutment step of bringing an abutment portion having predetermined shape and dimension into abutment against the plurality of ridges;
   a second abutment step of bringing the abutment portion into abutment against the plurality of ridges at a position separated from a position at which the plurality of ridges and the abutment portion are brought into abutment against each other in the first abutment step in a direction orthogonal to a rotation axis direction of the rotation power transmitting element by a predetermined radial distance;
   a distance measurement step of measuring a distance in the rotation axis direction between the position at which the plurality of ridges are brought into abutment against the abutment portion in the first abutment step and the position at which the plurality of ridges are brought into abutment against the abutment portion in the second abutment step; and
   a pitch cone angle calculation step of calculating a pitch cone angle of the rotation power transmitting element based on the measured distance in the rotation axis direction and the predetermined radial distance.

2. The pitch cone angle measurement method according to claim 1, wherein the abutment portion is moved in the rotation axis direction to bring the abutment portion into abutment against the plurality of ridges in each of the first abutment step and the second abutment step.

3. The pitch cone angle measurement method according to claim 1, wherein the shape and the dimension of the abutment portion are set so that the abutment portion is brought into abutment against the plurality of ridges at meshing positions between the plurality of ridges and the opposing ridges.

4. The pitch cone angle measurement method according to claim 1, wherein the abutment portion has a spherical shape.

5. The pitch cone angle measurement method according to claim 1,
wherein two abutment portions are used so that one of the abutment portions is elastically supported by a relative displacement measurement portion, and another one of the abutment portions is configured to be movable integrally with the relative displacement measurement portion,
wherein a movement distance in the rotational axis direction of the another abutment portion from a state in which the one abutment portion is held in abutment against the plurality of ridges to a state in which the another abutment portion is moved in the rotation axis direction to bring the another abutment portion into abutment against the ridge is measured by the relative displacement measurement portion as a relative displacement of the one abutment portion in the rotation axis direction, and
wherein the distance in the rotation axis direction is calculated based on the measured movement distance.

6. The pitch cone angle measurement method according to claim 1, wherein the rotation power transmitting element comprises a face spline.

7. The pitch cone angle measurement method according to claim 1, wherein at least one of the rotation power transmitting element on which the plurality of ridges are formed and a mating rotation power transmitting element on which the opposing ridges are formed constructs a wheel bearing device.

8. The pitch cone angle measurement method according to claim 1, wherein at least one of the rotation power transmitting element on which the plurality of ridges are formed and a mating rotation power transmitting element on which the opposing ridges are formed constructs a constant velocity universal joint.

9. The pitch cone angle measurement method according to claim 1, wherein one of the rotation power transmitting element on which the ridges are formed and a mating rotation power transmitting element on which the opposing ridge is formed constructs a wheel bearing device, and another one of the rotation power transmitting element and the mating rotation power transmitting element constructs a constant velocity universal joint.

10. A pitch cone angle measurement device which is configured to measure a pitch cone angle of a rotation power transmitting element that is formed by arranging a plurality of ridges in a circumferential direction, and is configured to enable transmission of rotation power through engagement with opposing ridges, the pitch cone angle measurement device comprising:
a first abutment portion that has predetermined shape and dimension, and is capable of being brought into abutment against the plurality of ridges;
a second abutment portion that is capable of being brought into abutment against the plurality of ridges at a position separated from a position at which the plurality of ridges and the first abutment portion are brought into abutment against each other in a direction orthogonal to a rotation axis direction of the rotation power transmitting element by a predetermined radial distance; and
a distance measurement portion that is configured to measure a distance in the rotation axis direction between the position at which the first abutment portion is brought into abutment against the plurality of ridges and the position at which the second abutment portion is brought into abutment against the plurality of ridges.

11. The pitch cone angle measurement method according to claim 2, wherein the shape and the dimension of the abutment portion are set so that the abutment portion is brought into abutment against the plurality of ridges at meshing positions between the plurality of ridges and the opposing ridges.

12. The pitch cone angle measurement method according to claim 2, wherein the abutment portion has a spherical shape.

13. The pitch cone angle measurement method according to claim 3, wherein the abutment portion has a spherical shape.

14. The pitch cone angle measurement method according to claim 11, wherein the abutment portion has a spherical shape.

15. The pitch cone angle measurement method according to claim 2,
wherein two abutment portions are used so that one of the abutment portions is elastically supported by a relative displacement measurement portion, and another one of the abutment portions is configured to be movable integrally with the relative displacement measurement portion,
wherein a movement distance in the rotational axis direction of the another abutment portion from a state in which the one abutment portion is held in abutment against the plurality of ridges to a state in which the another abutment portion is moved in the rotation axis direction to bring the another abutment portion into abutment against the ridge is measured by the relative displacement measurement portion as a relative displacement of the one abutment portion in the rotation axis direction, and
wherein the distance in the rotation axis direction is calculated based on the measured movement distance.

16. The pitch cone angle measurement method according to claim 3,
wherein two abutment portions are used so that one of the abutment portions is elastically supported by a relative displacement measurement portion, and another one of the abutment portions is configured to be movable integrally with the relative displacement measurement portion,
wherein a movement distance in the rotational axis direction of the another abutment portion from a state in which the one abutment portion is held in abutment against the plurality of ridges to a state in which the another abutment portion is moved in the rotation axis direction to bring the another abutment portion into abutment against the ridge is measured by the relative displacement measurement portion as a relative displacement of the one abutment portion in the rotation axis direction, and
wherein the distance in the rotation axis direction is calculated based on the measured movement distance.

17. The pitch cone angle measurement method according to claim 4,
wherein two abutment portions are used so that one of the abutment portions is elastically supported by a relative displacement measurement portion, and another one of the abutment portions is configured to be movable integrally with the relative displacement measurement portion,
wherein a movement distance in the rotational axis direction of the another abutment portion from a state in which the one abutment portion is held in abutment against the plurality of ridges to a state in which the another abutment portion is moved in the rotation axis direction to bring the another abutment portion into abutment against the ridge is measured by the relative displacement measurement portion as a relative displacement of the one abutment portion in the rotation axis direction, and wherein the distance in the rotation axis direction is calculated based on the measured movement distance.

18. The pitch cone angle measurement method according to claim 11, wherein two abutment portions are used so that one of the abutment portions is elastically supported by a relative displacement measurement portion, and another one of the abutment portions is configured to be movable integrally with the relative displacement measurement portion, wherein a movement distance in the rotational axis direction of the another abutment portion from a state in which the one abutment portion is held in abutment against the plurality of ridges to a state in which the another abutment portion is moved in the rotation axis direction to bring the another abutment portion into abutment against the ridge is measured by the relative displacement measurement portion as a relative displacement of the one abutment portion in the rotation axis direction, and wherein the distance in the rotation axis direction is calculated based on the measured movement distance.

19. The pitch cone angle measurement method according to claim 12, wherein two abutment portions are used so that one of the abutment portions is elastically supported by a relative displacement measurement portion, and another one of the abutment portions is configured to be movable integrally with the relative displacement measurement portion, wherein a movement distance in the rotational axis direction of the another abutment portion from a state in which the one abutment portion is held in abutment against the plurality of ridges to a state in which the another abutment portion is moved in the rotation axis direction to bring the another abutment portion into abutment against the ridge is measured by the relative displacement measurement portion as a relative displacement of the one abutment portion in the rotation axis direction, and wherein the distance in the rotation axis direction is calculated based on the measured movement distance.

20. The pitch cone angle measurement method according to claim 13, wherein two abutment portions are used so that one of the abutment portions is elastically supported by a relative displacement measurement portion, and another one of the abutment portions is configured to be movable integrally with the relative displacement measurement portion, wherein a movement distance in the rotational axis direction of the another abutment portion from a state in which the one abutment portion is held in abutment against the plurality of ridges to a state in which the another abutment portion is moved in the rotation axis direction to bring the another abutment portion into abutment against the ridge is measured by the relative displacement measurement portion as a relative displacement of the one abutment portion in the rotation axis direction, and wherein the distance in the rotation axis direction is calculated based on the measured movement distance.

* * * * *